INVENTOR
WALTER VAN B. ROBERTS.
BY
ATTORNEY

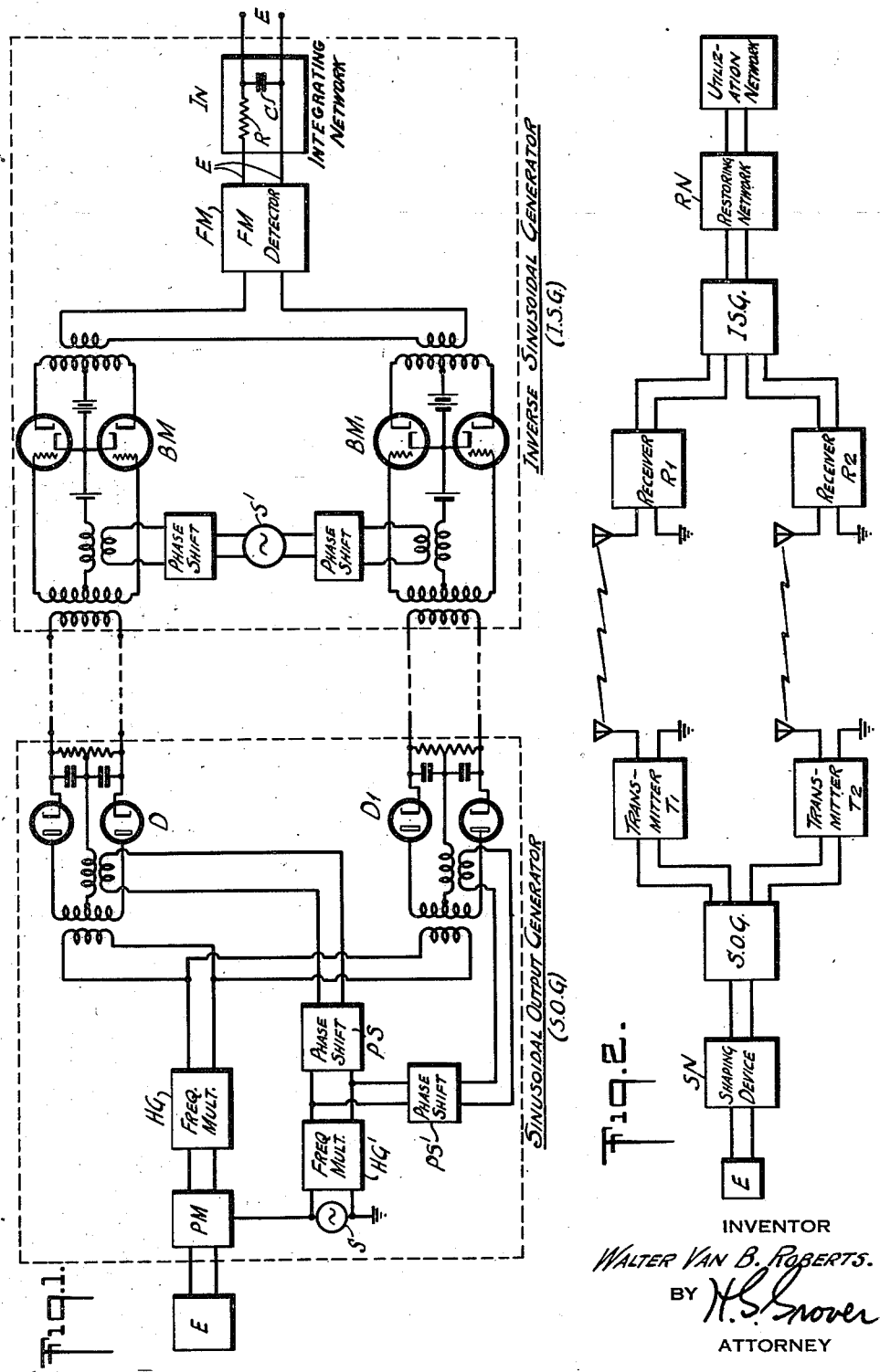

Patented Mar. 12, 1946

2,396,288

UNITED STATES PATENT OFFICE 2,396,288

SIGNALING SYSTEM

Walter van B. Roberts, Princeton, N. J., assignor to Radio Corporation of America, a corporation of Delaware Application April 29, 1943, Serial No. 484,972

17 Claims. (Cl. 179—1.5)

This invention relates primarily to means for producing, from a first voltage, a second voltage which is a function of said first voltage, and secondarily to the utilization of said means for providing improvements in transmission systems and for other purposes.

One object is to provide means for producing, from a first voltage E which is an arbitrary function of time, a second voltage which is a sinusoidal function of E, for example, $E_m \sin KE$ where K is a constant and $E_m$ is the amplitude of said sinusoidal voltage.

Another object is to recreate, from a pair of sinusoidal voltages such as $E_m \sin KE$ and $E_m \cos KE$, the voltage E of which said pair are functions.

A particular object is to utilize said pair of voltages as modulation voltages in a transmission system, whereby a predetermined degree of modulation is never exceeded for any value of the first voltage E, and whereby transmissions of such system are not intelligibly receivable on conventional receivers.

Fig. 1 shows means for producing from a given voltage E two voltages which are a sinusoidal function of the given voltage and means to produce from the two sinusoidal voltages the given voltage E.

Fig. 2 shows an embodiment of a signaling system wherein the means of Figure 1 are used to supply as modulating potentials the two produced voltages, whereby a given degree of modulation is never exceeded for any value of the given voltage and wherein a novel receiver is used to receive the transmitted signal and reconstruct therefrom the given voltage.

Figure 3:
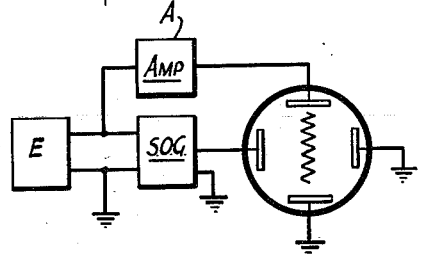
Fig. 3 shows a laboratory application of part of the arrangement of Fig. 1.

Referring to Fig. 1, E is a source of voltage whose instantaneous value is any arbitrary function of time, such as the complex waveform of voltage representative of speech. S is a source of alternating voltage of frequency which is high compared to any component frequency of the voltage E. "PM" is a phase modulator upon which voltage from E and S are impressed and whose output is therefore a voltage similar to the voltage from S except that it is phase modulated in accordance with E. The output of the phase modulator PM is subjected to frequency multiplication in HG whereby the amount of phase modulation is greatly increased, preferably to such extent that the phase deviation reaches many radians. This strongly phase modulated wave is then impressed on a (preferably push-pull) detecting system D, for example, the upper one, as shown. Meanwhile, some of the unmodulated voltage from S has been equally multiplied in frequency in HG′ and subjected to phase adjustment in PS and applied cophasably to the detectors D, also as shown. If this latter voltage is made large compared to the phase modulated voltage and if its phase on the detector is adjusted to be in quadrature with the phase of the modulated voltage on D when the modulating voltage E is zero, then it is evident that the amplitude of the output of the pair of detectors will vary as the sine of the phase deviation of the modulated voltage and hence will be $E_m \sin KE$, thus fulfilling the first object of the invention.

A duplicate detecting system D′ is arranged in parallel with the above described system, but in this latter detecting system the unmodulated (from HG′) voltage phase is adjusted in PS′ to be 90° different from that employed in the first detecting system D, whereby the output of the second system is $E_m \cos KE$.

It should be noted that other "phases" of the detector output voltages are obtainable by other adjustments of the shifters but that for most purposes it is only necessary to arrange that the unmodulated voltages applied to the two detecting systems be in quadrature with each other, which insures that one of the output voltages is an extremum when the other is zero, and vice versa. It is also possible to dispense with one of the rectifiers in each of the systems D and D′ for many purposes, especially when a direct current component in the output is not objectionable. Also, other equivalent methods of energizing the detectors may be employed equally well, but need not be described as such variations are well known.

To recapitulate, the dotted rectangle marked S. O. G. has two pairs of output terminals and one pair of input terminals, and converts an arbitrarily varying input voltage E to a pair of output voltages each varying sinusoidally with respect to E which are expressible as $E_{m1} \sin (KE+P_1)$ and $E_{m2} \cos (KE+P_2)$ where K is a constant equal to the phase deviation sensitivity of the modulator PM multiplied by the amount of frequency multiplication employed, and $E_m$ and P are constants determined by the circuit amplification and the phase shifter adjustments respectively. Ordinarily $E_{m1}$ and $E_{m2}$ will be made equal, say $E_m$, while $P_1$ and $P_2$ will be equal and preferably zero.

The other dotted rectangle of Fig. 1, marked I. S. G., shows inverse sinusoidal generating means to undo what the sinusoidal output generator device S. O. G. has done to the input voltage $E_1$. That is, the I. S. G. device has two pairs of input terminals and one pair of output terminals, and if voltages $E_m \sin KE$ and $E_m \cos KE$ are applied to the input terminals, a voltage proportional to E will be obtained at the output terminals. The I. S. G. device comprises a pair of balanced modulators BM and BM$_1$, a frequency modulation detector FM, an integrating network IN, and a source of alternating current S' whose frequency is high compared to other frequencies present in the I. S. G. device. By means of phase adjusters, voltage from S' is impressed on the two modulator systems in quadrature phase, while the two input voltages to the device are impressed on each of the modulators in phase opposition. The action of such a pair of balanced modulators is well known and it is therefore sufficient to state that when the two systems are symmetrically energized and coupled to a common output circuit, the resulting current in this circuit will be of the frequency of source S' but phase modulated to a phase deviation KE. Therefore, it might appear that this current need only be applied to any phase modulation detector to obtain the voltage E. Unfortunately, however, many phase modulation detectors are adapted to operate only on signals whose phase deviation does not exceed a small value of the order of one radian. In the present case KE may amount to a very large number of radians, so many in fact, as to cause a considerable variation in the instantaneous frequency of the wave. Therefore a frequency modulation detector may be employed for the demodulation of this strongly phase modulated wave but since the output of a frequency modulation detector varies as the rate of change of the input signal phase, the output will vary as the time rate of change of E. This undesired result may, however, be cured by passing the frequency modulation detector FM output through an integrating device IN whose output is therefore proportional to the desired voltage E. This integrating device may be of the simple form shown, where the time constant of the resistor R and condenser C combination is long compared to the period of any component frequency of the voltage E. In this case the current through the combination is substantially equal to the input voltage divided by the resistance, and the voltage drop across the condenser is therefore proportional to the time integral of the input voltage. A similar result may be obtained by using a condenser for the output impedance of a screen grid amplifier stage.

In describing the constitution of the I. S. G. device, particular forms of balanced modulator and integrating circuit have been shown, but it will be realized that similar results will be obtained from any arrangements adapted to produce from the two input voltages, a high frequency wave modulated in accordance with E, and to demodulate such wave to recreate a voltage proportional to E. Although it will be obvious to one skilled in the art, it may be noted that the frequency modulator detector FM, whatever type it be, shown in Fig. 1, should be arranged to receive the full spectrum of frequencies of the modulator output, but not a wider range than necessary for such purpose.

Fig. 1 has been described for the purpose of explaining the action of the two inversely behaving devices S. O. G. and I. S. G. The devices would not of course be connected directly together as shown in any practical application. Fig. 2 shows one application of the devices of Fig. 1 and is made a separate figure so that these devices may be indicated in a block diagram, thus avoiding a confusing complication of the diagram of Fig. 2.

In Fig. 2, a signaling voltage E is applied through a "shaping device" SN, whose effect will be neglected for the moment, to an S. O. G. device such as is shown at the left in Fig. 1. One of the outputs of the S. O. G. is employed to phase modulate a radio transmitter $T_1$ of any desired type. The other output phase modulates another transmitter, $T_2$, operating in a different frequency channel. At the receiving point, separate receivers $R_1$ and $R_2$ reconstruct the output voltages of the S. O. G. and apply them as input voltages to an I. S. G. device such as shown at the right in Fig. 1. In fact, the main difference so far to be noticed between Fig. 2 and Fig. 1 is that in Fig. 2 radio links replace the connections between S. O. G. and I. S. G. indicated by dotted lines in Fig. 1. The output of the I. S. G. is passed through a "restoring network" RN and then applied to a utilization device. As to the shaping and restoring networks SN and RN, neither of these are necessary if conventional radio transmission is employed, which yields a receiver output that is a faithful replica of the transmitter modulating voltage. In case, however, $T_1$, $T_2$ are phase modulating transmitters while $R_1$, $R_2$ are frequency modulation receivers, then an integrating network, such as that shown at IN in Fig. 1, for example, should be employed either as a shaping device SN ahead of the S. O. G., or as a restoring device RN after the I. S. G. Furthermore, it may be desirable to employ some sort of shaping device for preemphasizing some characteristic of the signals, as explained in my copending application Serial No. 475,601, filed February 12, 1943. In such a case a suitable restoring device will be employed to restore such characteristic to its original relation to the signal.

A modification of Fig. 2 which obviates the necessity of independent channels for the transmitters is as follows: $T_1$ is a narrow phase modulation transmitter and $R_1$ a phase modulation receiver therefor which is non-responsive to amplitude modulation. $T_2$ is an amplitude modulation transmitter and $R_2$ a receiver therefor which is non-responsive to the modulation of $T_1$. Hence $T_1$ and $T_2$ can operate on the same carrier. In another modification, only a single transmitter is required, its output wave being modulated in frequency, for example, by one output of S. O. G. and in amplitude by the other output of S. O. G.

In any case, it will be seen that the transmission cannot be received on any ordinary receiver since the output of such receivers will be merely a sinusoidal wave generated by the S. O. G. at the transmitter and such waves are unintelligible until reconverted to the original voltage by means of an I. S. G. device such as shown. In addition to a high degree of privacy afforded by the system of Fig. 2, there is provided an improvement in transmission efficiency due to the fact that each transmitter modulation is of constant maximum degree thereby precluding the possibility of over-modulation while at the same time maintaining the advantage of full modulation even during weak signal periods.

While I have illustrated one application of the devices explained in Fig. 1, it will be appreciated that they may be put to a variety of other uses. As an example of a use for a S. O. G. device in quite a different field, Fig. 3 shows how an oscilloscope may be used as a voltmeter to measure voltage independently of any variation in the deflection sensitivity of the electron gun, and of the amount of amplification of the voltage to be measured. In Fig. 3, E is the voltage to be measured, here assumed to be periodic although of any wave shape. This voltage is amplified in A to any desired extent and applied to the vertical deflection plate for example, of the oscilloscope S. At the same time, the voltage E is impressed on a S. O. G. device which for the present purpose need have only one detecting system and one output voltage. This output voltage is applied to a horizontal deflection plate and produces a wiggly trace as shown. Since there are a fixed number of horizontal excursions per volt of E, the peak voltage of E may be obtained by counting the total number of horizontal excursions visible, this number being independent of the height of the trace which latter can be adjusted to any convenient height by adjusting the gain of the amplifier A.

Figure 4A:
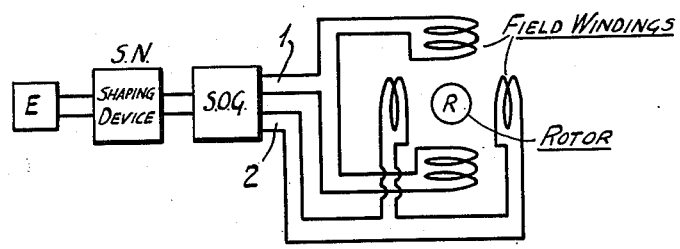
Fig. 4a shows means for the production and use of a rotary field, by means of the two voltages derived from the given voltage.

Another general type of application for the S. O. G. is the production, from the output voltages of the S. O. G., of a rotating magnetic or electric field whose angular displacement is proportional to the voltage input to the S. O. G. device. Fig. 4a shows means for producing such a rotating magnetic field. The outputs 1 and 2 of the S. O. G. are preferably adjusted to be in phase quadrature and are applied to field coil systems which produce, in the region of rotor R, magnetic fields at right angles in space. The angular position of the resultant magnetic field is then determined by the input voltage to the S. O. G. The input voltage may be "preshaped" in SN, if desired, to cause the rotating field to depend in a different way upon the unshaped voltage than has been stated. For example, if the shaping network SN is arranged to produce an output voltage proportional to the rate of change of its input voltage, then the angular displacement of the rotary field will be proportional to rate of change of the voltage applied to the shaping network. The rotor element R may be a light transverse permanent magnet whose direction will follow the direction of the resultant field provided the angular acceleration thereof is not too great. Or the rotor R may be simply a conducting body in which case a torque is developed therein proportional to the speed of rotation of the resultant field.

Figure 4B:
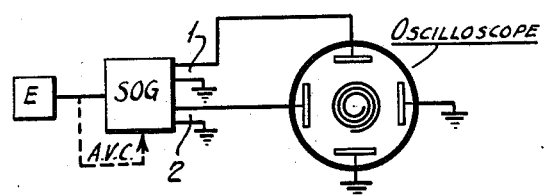
Fig. 4b shows means for the production of a rotary electric field applied to an oscilloscope.

Fig. 4b shows means to develop a rotary electric field, or its equivalent, and apply the same to an oscilloscope. The output voltages of an S. O. G. at 1 and 2 are connected to the vertical and horizontal deflection plates of the oscilloscope, these output voltages being adjusted to phase quadrature. The oscilloscope spot is thus caused to rotate in a circle whose diameter depends upon the amplitude of the S. O. G. output voltages. As a further feature of Fig. 4b the rotating spot is prevented from retracing the same circle at each successive turn by varying the said amplitude in accordance with the input voltage to the S. O. G. The resultant trace is then a spiral as indicated on the drawing. In the drawings the dotted line marked "AVC" indicates that the voltage E is utilized to control the output voltage of the S. O. G. This is preferably done as follows: Referring to Fig. 1, imagine that the last stage of the frequency multiplier HG includes a tube having a grid whose bias controls the amplitude of the frequency multiplied output, for example, a suppressor grid. The voltage E, or a portion thereof, is then connected so as to vary the bias of this grid. Thus when E is small, the oscilloscope spot travels at a medium distance from the center of the screen. As E becomes more positive this distance becomes greater, while as E becomes more negative the distance becomes smaller. Since the total length of spiral travelled by the spot in one peak to peak swing of a periodic voltage E may be made very much greater than the diameter of the oscilloscope screen, this peak to peak voltage may be read to a correspondingly greater accuracy than in the ordinary use of an oscilloscope as a voltmeter, and furthermore, the voltage reading is entirely independent of the constants of the oscilloscope, being dependent only upon the amount of phase deviation in the S. O. G. output per volt input to the S. O. G.

I claim:

1. The method of deriving, from a first voltage, a second voltage which is a sinusoidal function of said first voltage, which includes these steps, producing an auxiliary high frequency voltage, phase modulating said high frequency voltage to a high degree in accordance with said first voltage, and combining said phase modulated high frequency voltage and said high frequency voltage and rectifying said combined voltages.

2. The method recited in claim 1, wherein said high frequency voltage is phase modulated a small amount and said modulated voltage and said high frequency voltage are multiplied in frequency equal amounts before combining and rectifying.

3. The method of deriving, from a first voltage, two other voltages which are sinusoidal functions of said first voltage, which includes these steps, producing an auxiliary high frequency voltage, phase modulating said high frequency voltage to a high degree in accordance with said first voltage, separately combining two portions of said phase modulated high frequency voltage with two portions of said unmodulated high frequency voltage, the phase relation between the voltages in one of said combinations being made different from that in the other combination and separately rectifying the combined voltages.

4. The method as recited in claim 3, wherein the high frequency voltage is phase modulated a small amount and said phase modulated voltages and unmodulated voltages are multiplied equal amounts before being combined.

5. The method of deriving, from a first voltage, a second and third voltage each of which is a sinusoidal function of said first voltage and which have a desired phase relation with each other which includes these steps, generating a high frequency voltage, modulating the phase of said high frequency voltage to a high degree in accordance with said first voltage, combining a first portion of said phase modulated high frequency voltage with a first portion of said unmodulated high frequency voltage and rectifying the combined voltage to derive said second voltage, combining a second portion of said phase modulated high frequency voltage with a second portion of said unmodulated high frequency voltage and rectifying the combined voltage to derive said third voltage and adjusting the relative phase of the voltages in at least one of the voltage combinations to attain the desired phase relation between said second and third voltages.

6. The method of recovering an original signal from a pair of dissimilar phase voltages each of which is a sinusoidal function of a voltage derived from said signal voltage which includes these steps, producing a high frequency auxiliary wave, modulating said auxiliary high frequency wave in accordance with said pair of sinusoidal voltages to produce a wave which is phase modulated in accordance with said original signal, detecting the variations of instantaneous frequency of this phase modulated high frequency auxiliary wave to derive a voltage characteristic of said variations and integrating said last named voltage to obtain a voltage linearly related to said voltage derived from said signal voltage.

7. The method of recovering an original signal from a pair of dissimilar phase voltages each of which is a sinusoidal function of a voltage derived from said signal voltage which includes these steps, producing a high frequency auxiliary wave, separately modulating each of two phase displaced portions of said auxiliary high frequency wave in accordance with said pair of sinusoidal voltages, combining the so modulated waves, detecting the variations of instantaneous frequency of the combined modulated high frequency auxiliary waves to derive a voltage characteristic of said variations and integrating said last named voltage to obtain a voltage linearly related to said voltage derived from said original signal.

8. The method of secret signaling which includes these steps, generating a first voltage characteristic of signals, deriving from said first voltage a second and a third voltage which are phase displaced sinusoidal functions of said first voltage, modulating one carrier characteristic with said second voltage and another carrier characteristic with said third voltage, separately detecting said modulations to produce a fourth voltage, and modifying said fourth voltage to correspond to said first voltage.

9. The method of signaling which includes these steps, generating a first voltage characteristic of signals, deriving from said first voltage a second voltage which is a sine function of said first voltage, deriving from said first voltage a third voltage which is a cosine function of said first voltage, modulating a carrier in accordance with said second voltage, modulating a second carrier in accordance with said third voltage, transmitting the modulated carriers, receiving the transmitted carriers and demodulating the same to recover voltages corresponding to said second and third voltages, combining the recovered voltages, and deriving from the combined voltages, voltage corresponding to said first voltage.

10. The method of signaling which includes these steps, producing a signal voltage, deriving from said signal voltage two voltages each of which are sinusoidal functions of said first voltage, modulating the phase of a first high frequency voltage in accordance with one of said two voltages, modulating the phase of a second high frequency voltage in accordance with the other of said two voltages, transmitting said phase modulated voltages, receiving the transmitted energy, detecting said energy to derive a new voltage, and subjecting said new voltage to correction so that said new voltage corresponds to said signal voltage.

11. The method of signaling which includes these steps, producing a high frequency voltage, modulating the phase of said high frequency voltage in accordance with said signal voltage, mixing modulated high frequency voltages with phase displaced voltages of the frequency of said high frequency voltage, detecting said mixed voltages to derive two new voltages which may be represented by the sine and cosine functions respectively of said first voltage, transmitting said derived voltages, differentially modulating phase displaced carriers by the respective derived voltages, combining the differentially modulated carriers, and subjecting the combined energy to a frequency demodulation and integration process to derive the original signal voltage.

12. In a transmission system of the nature described, a source of signal voltage, means for deriving from said signal voltage a pair of voltages each of which is a function of said signal voltage, means for separately transmitting each of said pair of voltages to a receiving point, means at said receiving point for converting said pair of voltages back to said signal voltage and means for utilizing said recovered signal voltage.

13. In means for deriving from an arbitrarily varying first voltage, a second voltage which is a harmonic function of the instantaneous value of said first voltage, a source of alternating current, the frequency of which is high as compared to the said arbitrarily varying first voltage, a phase modulator for strongly phase modulating alternating current by said first voltage, a rectifier, connections between said rectifier and said phase modulator, connections between said source of alternating current and said rectifier for impressing both said phase modulated current and said unmodulated current on said rectifier, a phase adjuster in one of said connections, and a selecting circuit connected to said rectifier for selecting therefrom the voltage corresponding to said second voltage while rejecting voltage of a frequency equal to that of said source of alternating current and higher.

14. In a system of the class described, a source of signal voltage, means for deemphasizing a characteristic of said signal voltage, means for deriving from the deemphasized signal voltage a pair of voltages each of which is a function of said deemphasized signal voltage, means for separately transmitting each of said pair of voltages to a receiving point, means at said receiving point for combining said pair of voltages to derive a resultant voltage, and means for restoring a characteristic of said resultant voltage back to its original relation with respect to the said signal voltage.

15. In a signaling system, a source of signal voltage, means for deriving from the signal voltage a pair of voltages each of which is a function of the signal voltage, separate means for sending each of the derived voltages to a receiving point, and means at said receiving point for combining said pair of voltages to derive a resultant voltage corresponding to said original signal voltage.

16. In a signaling system, a source of signals, means coupled to said source for deriving two voltages each of which are sinusoidal functions of said signal voltage, separate means for conveying each of the derived voltages to a receiving point, and means at said receiving point for combining said two voltages to derive a resultant voltage corresponding to the signal voltage.

17. In a signaling system the method which includes these steps, deriving from a signal voltage a voltage which is a sinusoidal function of the signal voltage, modulating a carrier in accordance with said derived voltage, sending the modulated carrier to a receiving point, at the receiving point demodulating the carrier to derive a voltage corresponding to said resultant voltage, and deriving from the resultant voltage a voltage corresponding to the signal voltage.

WALTER van B. ROBERTS.